Feb. 11, 1969    B. SIEBELHOFF    3,427,036
HYDRAULIC CHUCK
Filed Oct. 23, 1965

INVENTOR.
BERND SIEBELHOFF
BY
Parrott, Bell, Seltzer, Park & Heard

United States Patent Office 3,427,036
Patented Feb. 11, 1969

3,427,036
HYDRAULIC CHUCK
Bernd Siebelhoff, Solingen, Germany, assignor to Rheinmetall G.m.b.H., Dusseldorf, Germany, a company of Germany
Filed Oct. 23, 1965, Ser. No. 503,829
Claims priority, application Germany, Oct. 27, 1964, R 39,110
U.S. Cl. 279—4          3 Claims
Int. Cl. B23b 31/30

ABSTRACT OF THE DISCLOSURE

A fluid operated chuck wherein a plurality of individual clamping members are supported within a longitudinally movable sleeve in such a manner as to be restrained to movement only radially of the sleeve in response to longitudinal movement of the sleeve within a housing means and for transmittal of forces applied longitudinally of a workpiece gripped by the clamping means to the housing through a planar support surface perpendicular to the axis of the housing with which the clamping means are in engagement.

---

Figure 1:
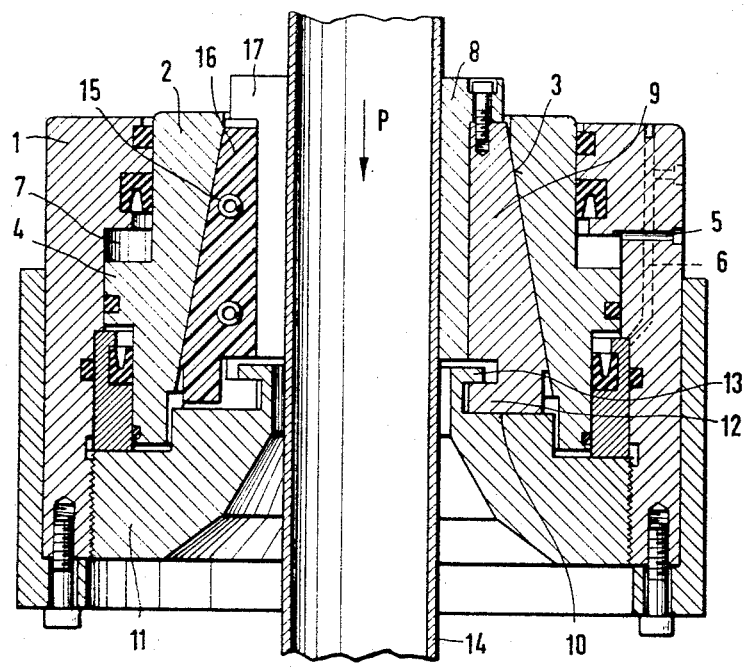

This invention relates to a hydraulic chuck and, more particularly, to a chuck for receiving and holding a workpiece such as a pipe, tube, bar or the like during deformation of the workpiece by an axially directed force.

When cold working, upsetting, or swagging the ends of workpieces such as pipes by applying an axially directed force thereto, difficulties have been encountered in providing a workholder for properly holding a workpiece, as the same must be held so as not to be displaced by the deforming force yet not damaged or deformed by a holding force. These characteristics of the workholder or chuck must be retained even if lubricants or dirt interfere with otherwise proper operation of the chuck.

Workholders previously known and used for such purposes have included hydraulic chucks comprising an axially displaceable sleeve and acting through conical surfaces on chucking elements movable in a radial direction. Such chucks have not always been satisfactory, however, because they typically comprise a large number of individual members which are difficult to manufacture and lead to trouble during operation, or because they are not capable of taking up or withstanding the large workpiece deforming forces acting in an axial direction on the chuck and occuring in particular in upsetting machines or tube reducing presses, or of supplying the chucking force required for such uses.

Another disadvantage of known chucks when used with upsetting machines is the dependency of the chucking or holding force on the upsetting or workpiece deforming force applied by the machine, which often results in either deformation of the chuck workpiece by the chucking force or otherwise defective distortion of the workpiece.

It is the primary object of this invention to provide a hydraulic chuck which is not subject to the aforementioned deficiencies and which has a comparatively simple design. This object is accomplished by providing a chuck comprising an axially displaceable sleeve having a conical internal bore and chucking elements abutting said bore and being movable radially. In accordance with this invention, the sleeve is substantially cylindrical on its outer side and comprises a collar-shaped piston portion to both sides of which fluid pressure is applied. This provides a basis for a simple design for the chuck, while allowing comparatively high chucking forces to be attained.

Preferably, the outer diameters of the sleeve are made to differ on the two sides of the piston portion, in such a manner that the piston area on which pressure acts to move the sleeve in the chucking or workpiece gripping direction is larger than the piston area on which pressure acts to move the sleeve in the release direction, so that the amount of pressure fluid required for the same stroke length is smaller for movement in release direction than in the chucking direction, and a quick release of the chucking elements is attained.

Furthermore, another advantage of this invention is that the chucking elements bear directly on annular supporting surfaces so as to unyieldingly transmit the workpiece deforming force of a cold working press with which the chuck is used, so that radial movement of the chucking elements due to that force is avoided and the chucking force is determined solely by the hydraulic pressure acting on the collar-shaped piston.

Some of the objects and advantages of this invention having been stated, others will appear as the description proceeds, when taken in connection with the accompanying drawing, in which—

Figure 2:
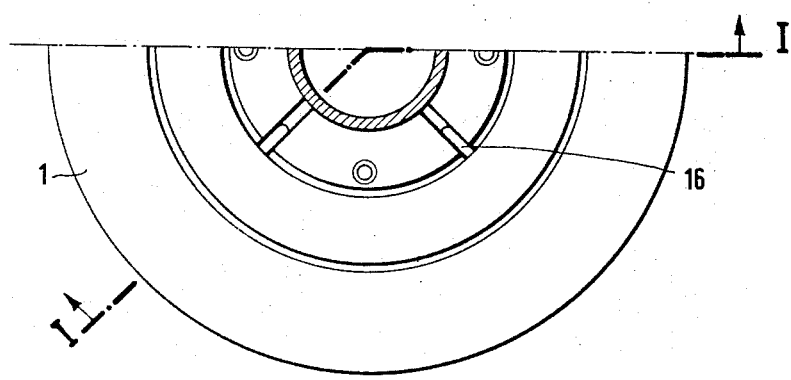

FIGURE 1 is a sectional view of a hydraulic chuck according to this invention, taken along line I—I in FIGURE 2; and FIGURE 2 is a top plan view of one-half of the symmetrical chuck.

The hydraulic chuck represented in the drawing serves to chuck pipes or similar workpieces at a pipe reducing press or other cold working machine. With reference to the drawing, a chucking sleeve means 2 having a conical internal bore 3 is guided so as to be axially slidable in a cylindrical housing means 1, which is adapted to be supported in or on the frame of a cold working machine (not shown). The conical bore 3 is so formed as to broaden towards the interior of the chuck. In its middle area, as seen in the longitudinal direction, the sleeve 2 comprises a collar-shaped piston 4, which may be acted upon on both sides by a pressure fluid supplied through conduits 5, 6 formed in the housing 1 and connected to a pressure pump (not shown) and to a fluid pressure cylinder or annular chamber 7 defined by the housing 1.

Clamping means or chucking elements are provided which consist of clamping jaw holders 9, to which the actual clamping jaws 8 are removably mounted. In order to take up and transmit the upsetting force P of the press, the clamping jaws comprise an annular shoulder 17 which is fixed to the associated clamping jaw holder by means of screws. The clamping jaw holders have conical outer surfaces contacting the conical internal bore 3 of the chucking sleeve 2 and, with their rearward ends disposed in the interior of the chuck, bear by means of an annular supporting surface 10 against a supporting ring 11 mounted in the housing 1 of the chuck. Furthermore, the clamping jaw holders are restrained by this supporting ring 11 for movement in a radial direction, in that they engage by means of a claw 12 behind a flange 13 provided at the supporting ring.

When pressure fluid is applied through conduit 5 to the annular chamber 7, the fluid acts on a first piston area, namely the upper surface of the collar piston 4, to move the sleeve 2 into the position shown in FIGURE 1. Due to the engagement of the conical surfaces, the clamping jaw holders 9 and the clamping jaws 8 move radially inwardly and thus chuck on all sides a pipe 14 inserted into the chuck, with helical springs 15 provided between the clamping jaw holders being compressed. Foam rubber cushions 16 are provided between adjacent radial side surfaces of the individual clamping jaw holders to prevent the ingress of dirt into the interior of the chuck. Since the conical bore 3 flares outwardly towards the interior of the chuck and the chucking elements 8, 9 are supported through the supporting surface 10 on the supporting ring 11, the upsetting force P exerted by the press cannot take effect on the chucking force of the chucking elements, and the chucking force is determined solely by the hydraulic pressure acting through the conduit 5 on the first area of the piston 4.

To release the chuck, the supply of pressure fluid is reversed or changed over, so that pressure is applied to a second piston area of the piston 4, namely the lower surface thereof, through conduit 6. This causes the sleeve 2 to move upwardly (in FIGURE 1), and the radially inward force on the chucking elements is removed. The force of the helical springs 15 forces the clamping jaw holders 9 radially apart.

As may be seen from the drawing, the outer diameter of the sleeve 2 differs on the two sides of the collar piston 4. On that side of the piston to which pressure is applied to move the same in the release direction, sleeve 2 has a greater diameter and consequently there is a smaller annular area for the second piston area than on that side of the piston to which pressure is applied to move the same in the chucking direction, or for the first piston area. When a pressure fluid pump having a constant delivery is used, a quick release of the chucking elements is thus achieved.

In the drawings and specification there has been set forth a preferred embodiment of the invention and, although specific terms are employed, they are used in a generic and descriptive sense only and not for purposes of limitation, the scope of the invention being defined in the claims.

What is claimed:
1. A fluid pressure operated chuck adapted for use in conjunction with a press for holding a workpiece to be deformed by press operation and comprising:
  housing means defining a fluid pressure cylinder having a longitudinal axis, and including a support surface perpendicular to said axis and a guiding flange spaced longitudinally from said support surface,
  sleeve means supported for movement within said housing means longitudinally of said cylinder and having an annular outwardly projecting rib portion defining opposed first and second piston areas and cooperating with said cylinder for movement of said sleeve means in response to selective application of pressure to one of said areas, said sleeve means having a conical bore therethrough, and
  a plurality of individual clamping means within said sleeve means, each of said clamping means having a tapered side edge engaging said bore for movement of said clamping means redially within said sleeve means in response to longitudinal movement of said sleeve means to grip a workpiece inserted therethrough, having a planar base end engaging said support surface for transmitting to said housing means forces applied longitudinally of the workpiece, and having a projecting claw engaging said guiding flange for restraining said clamping means to movement only radially of said sleeve means.

2. A chuck as claimed in claim 1 in which said first piston area is greater than said second piston area.

3. A chuck as claimed in claim 1 wherein each of said individual clamping means comprises a clamping jaw holder and a clamping jaw mounted on the clamping jaw holder, said clamping jaw holder including the aforementioned planar base end and tapered side edge for engagement with said sleeve means and said housing means respectively, and further wherein the extremities of said individual clamping means remote from said support surface are exposed outside said housing means.

References Cited

UNITED STATES PATENTS

| | | | |
|---|---|---|---|
| 2,219,008 | 10/1940 | Drissner | 279—46 |
| 2,418,082 | 3/1947 | Marasko | 279—4 |
| 2,788,979 | 4/1957 | Skillin | 279—4 |
| 2,814,496 | 11/1957 | Damijonaitis | 279—4 |
| 2,982,557 | 5/1961 | Anschutz | 297—57 |

FOREIGN PATENTS 1,182,887  6/1959  France.

LESTER M. SWINGLE, *Primary Examiner.*

R. V. PARKER, JR., *Assistant Examiner.*